United States Patent
Wehling et al.

[19]

[11] Patent Number: 6,056,909
[45] Date of Patent: May 2, 2000

[54] CASTING MOLD FOR PRECISELY ALIGNING AN ELECTRONIC CIRCUIT WITH A CAST WALL AND METHOD OF USING SAME

[75] Inventors: Hans Wilhelm Wehling, Oberhausen; Reinhard Stumpe, Neuhausen; Joachim Kuhn, Munich, all of Germany

[73] Assignee: ITT Manufacturing Enterprises Inc., Wilmington, Del.

[21] Appl. No.: 08/765,487

[22] PCT Filed: Jun. 27, 1995

[86] PCT No.: PCT/EP95/02497

§ 371 Date: Mar. 20, 1997

§ 102(e) Date: Mar. 20, 1997

[87] PCT Pub. No.: WO96/00645

PCT Pub. Date: Jan. 11, 1996

[30] Foreign Application Priority Data

Jun. 29, 1994 [DE] Germany .................................. 4422739

[51] Int. Cl.⁷ .............................. B29C 45/14; G01P 1/02; B29F 1/10
[52] U.S. Cl. ............................... 264/272.15; 264/272.17; 264/278; 425/125; 425/117
[58] Field of Search .......................... 264/272.1, 272.11, 264/272.14, 272.15, 272.16, 272.17, 275, 277, 278; 425/110, 117, 125

[56] References Cited

U.S. PATENT DOCUMENTS

| | | |
|---|---|---|
| 3,363,040 | 1/1968 | Aoki . |
| 4,470,786 | 9/1984 | Sano et al. . |
| 4,555,086 | 11/1985 | Kiyotomo . |
| 4,629,597 | 12/1986 | Charlebois et al. . |
| 4,888,307 | 12/1989 | Spatrisano et al. . |
| 5,137,677 | 8/1992 | Murata . |

FOREIGN PATENT DOCUMENTS

| | | |
|---|---|---|
| 0472199 | 2/1992 | European Pat. Off. . |
| 0642026 | 3/1995 | European Pat. Off. . |
| 2576245 | 7/1986 | France . |
| 1902832 | 8/1970 | Germany . |
| 2141556 | 2/1973 | Germany . |
| 2320098 | 11/1973 | Germany . |
| 2514243 | 10/1975 | Germany . |
| 2517604 | 11/1975 | Germany . |
| 3228214 | 2/1983 | Germany . |
| 3137883 | 7/1983 | Germany . |
| 3819835 | 12/1989 | Germany . |
| 4031490 | 9/1991 | Germany . |
| 576334 | 5/1975 | Switzerland . |
| 1509266 | 9/1989 | U.S.S.R. . |
| 1597278 | 10/1990 | U.S.S.R. . |
| 1666326 | 7/1991 | U.S.S.R. . |
| 1131612 | 10/1968 | United Kingdom . |
| 1313748 | 4/1973 | United Kingdom . |
| WO9314618 | 7/1993 | WIPO . |

OTHER PUBLICATIONS

Search Report of the German Patent Office for Application P4422739.6 (no translation) May 1995.

Japanese Abstract 3–220738, Dec. 1991.

English Translation of the International Preliminary Examination Report for Application PCT/EP95/02497, Mar. 1997.

Patent Document SEL/Reg. 11 441 dated Feb. 22, 1968 (no translation).

Patent Document PA291019 dated May 14, 1959 (no translation).

*Primary Examiner*—Walter E. Snow
*Attorney, Agent, or Firm*—J. Gordon Lewis

[57] ABSTRACT

The invention relates to a method and apparatus for providing a casing for a sensor which is to be thin-walled in places. The principle of the invention is to align the sensor circuit precisely and completely seal it in plastic using separately actuatable support devices and a slowly curing plastic.

14 Claims, 3 Drawing Sheets

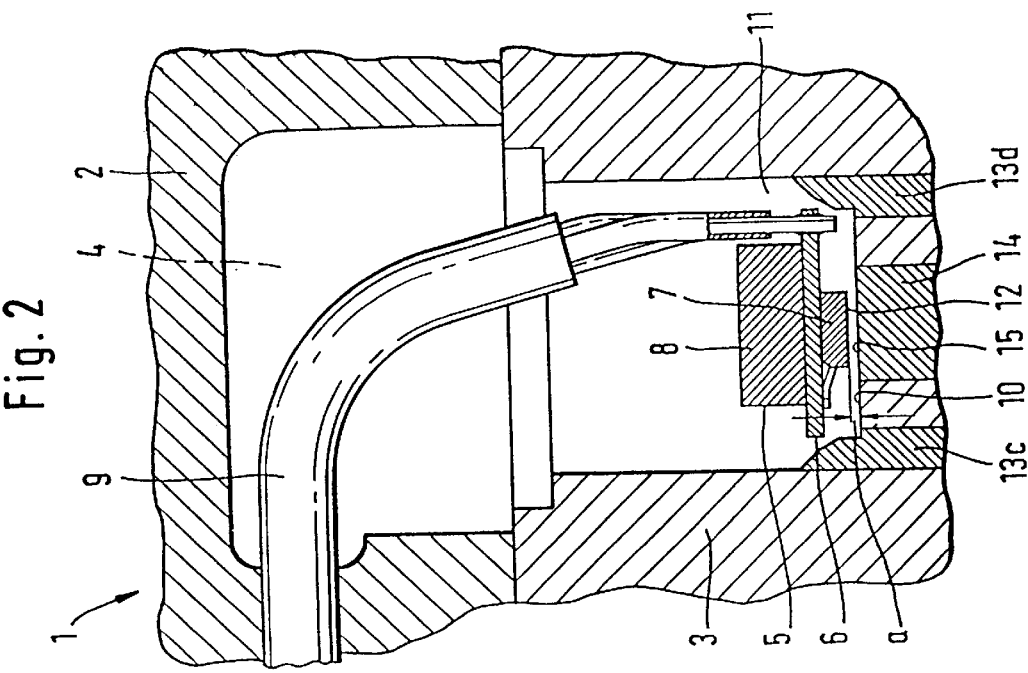
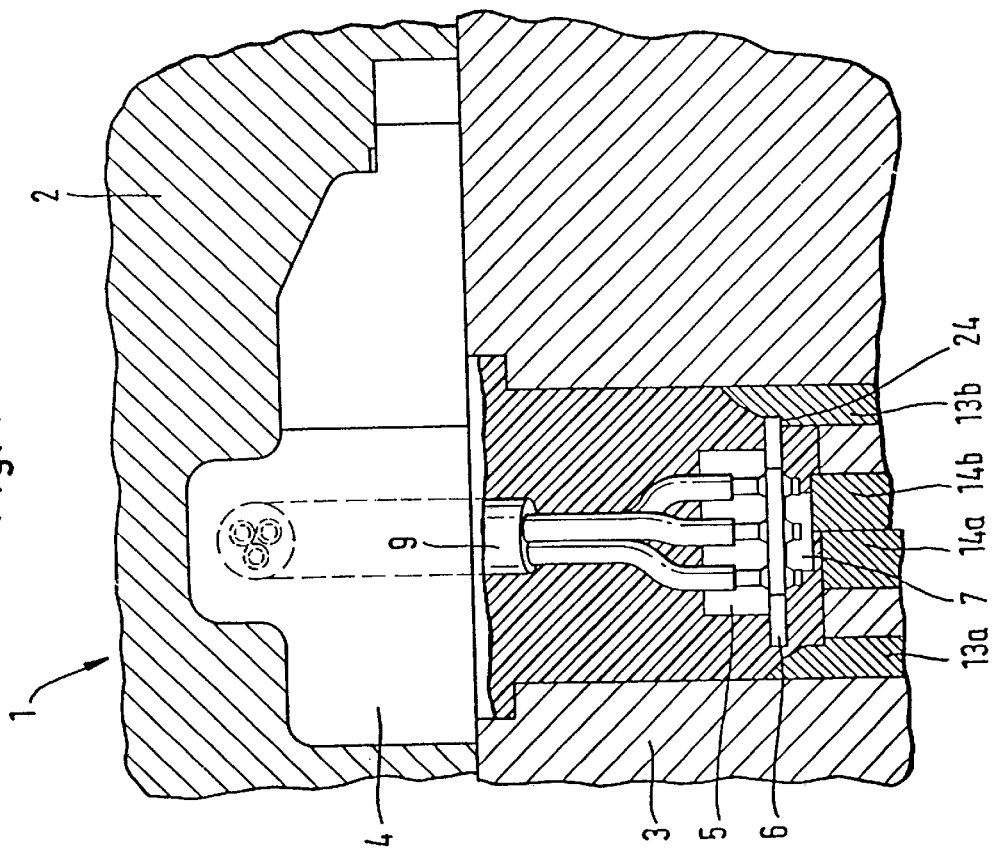

CASTING MOLD FOR PRECISELY ALIGNING AN ELECTRONIC CIRCUIT WITH A CAST WALL AND METHOD OF USING SAME

BACKGROUND OF THE INVENTION

This invention relates to electronic circuits joined to an external fixture so as to precisely locate the circuit.

TECHNICAL FIELD

The invention relates to an electronic circuit arranged sealed in a case, whereby at least a part of the electronic circuit is to be arranged at a very small distance precisely aligned on the outer surface of the cast envelope. Such an electronic circuit can, for example, be a gear sensor with Hall IC, or an ABS sensor with Hall IC, which, to measure a rotation, must be tightly connected to a rotating system. The information thus obtained can be used to measure speed in the case of tachometers or to measure steering angle in the case of steering gears. On the one hand, such sensors are required to be very rugged and thus must be well sealed off from environmental factors. But on the other hand, the distance between the Hall IC and the rotating system must also be very small to achieve a sufficiently strong, precise signal through the Hall ICs used. This means that the case wall must be extremely thin, at least at the point of connection between the rotating system and the electronic circuit.

The problems dealt with here are dealt with in German patent disclosures DE-OS 41 42 727 and DE-OS 41 41 958, among others. To meet the above-mentioned requirements, the Hall IC was previously held in a holder which, if necessary, also received other sections of an electronic circuit at another point and the thus equipped holder was inserted centered into a case. In that example, the case itself could in turn consist of several parts which on the one hand provided, in the form of a metal sleeve or plastic sleeve, for example, for a secure, thin-walled casing of the circuit, while the case part where wall-thickness was not critical was formed by a plastic section.

The technical objective of the invention is thus to create an electric circuit that is aligned precisely in its ruggedly constructed case, whereby the circuit equipped with the case should also be economical to produce. In particular, the technical problem of the invention is to enable the case walls to be very thin if necessary and, especially in the area of this thin case-wall, to enable an electric component to be aligned very precisely on this wall.

The technical objective of the invention is furthermore to indicate a method to produce such an electric circuit as well as to disclose a mechanism with which this method can be executed.

The inventive method thus consists, in principle, in casing the electric circuit by casting round it with a slow-setting plastic. In the process, the electric circuit, which can be attached on a printed circuit board, is held in the desired position via the centering holder during the casting process and during hardening. At a time when the plastic is still soft, the centering holder is then withdrawn, whereby the electric circuit is held in the desired position by the not yet completely hardened plastic. Because the soft plastic largely fills in the resulting impression while the centering holder is withdrawn, it is thereby achieved on the one hand that the electric circuit remains in its position in the plastic case, while, on the other hand, the circuit is completely enveloped by plastic. The enveloping process can be even further improved in that, in the injection molding process, during turning back, the injection pressure is maintained in such a way that not only the recesses resulting from the withdrawal are filled in by suction forces and gravity, but at the same time the injection pressure also contributes to filling up the recesses.

The electric circuit, which is preferably attached on a printed circuit board, is centered by means of the centering holder in such a way that centering fingers spread over its surface and/or its periphery hold the board in its position during the casting and/or injection process. However, a certain displacement can occur because, due to the casting or injection pressure that acts on the printed board, it becomes warped and thereby the distance of the printed board, in its middle area not supported by the centering fingers, is at an undetermined distance from the bottom of the mold during the casting process. This occurs in particular precisely when the distance of the printed circuit board and/or of one of its components from the bottom of the casting mold is to be very small, in such a way that the tolerance of this distance obtained during casting becomes quite large. In addition, with such a small space for the plastic to pass between the printed board and the bottom of the mold, its flow is considerably hindered, in such a way that an absolute tightness of the case is jeopardized. It can therefore occur that despite securing, a substantial area of the printed board, whose exact position in relation to the outer surface of the case is decisive, is at a distance outside of the desired narrow tolerances. To solve this problem, it is proposed to use an additional spreader that is movable independently of the centering holder and that can selectively engage that point on the printed board where the distance from the outer surface of the case is decisive.

In a preferred embodiment, the critical point is determined by the surface of an electrical component that belongs to the electric circuit and whose position is to be aligned exactly on the slightly removed surface of the case. The described measures are particularly advantageous when the component to be held at precise distance is a Hall IC, because the accuracy and the level of the signal obtained depend particularly on the position of the IC from the moving system, for example the gears of a rotating gearwheel.

Preferably the spreader and the centering holder are movable independently of each other, i.e., they can be withdrawn from the mold one after the other at the defined time interval. That creates the possibility, during a first period when the plastic is still very fluid, to support by the spreader the point on the electric circuit (e.g., the Hall IC) where the distance is critical and to support the printed board additionally by the centering holder. Since the spreader protrudes only slightly out of the bottom of the mold because of the required distance, it will be withdrawn while the plastic mass is still soft enough to seal seamlessly and tightly the impression created. In the process, however, the plastic cannot be so soft that the position of the component could change during the withdrawal of the spreader.

In a second step, as already described above, the centering fingers are then withdrawn, resulting in a seamless, complete enveloping of the electric circuit.

As explained further on, under certain circumstances the two holders can advantageously also be withdrawn in inverse order.

If one wishes to obtain as level a surface as possible at the circuit case's outer surface corresponding to the bottom surface of the casting mold, spreader is withdrawn until its face facing the electric circuit essentially ends with the bottom surface of the casting mold.

Although the above-described measures yield good results, it can still happen that on the one hand the printed board equipped with the electric circuit floats during the casting process and thus does not assume the prescribed position. In addition, it is possible that the critical point (for example the Hall element) does not lie exactly on the spreader, although the spreader establishes the desired thickness of the case wall above the critical point of the printed board. To avoid such difficulties, it is recommended that after the electric circuit is laid in and before the plastic is filled in, a stop mechanism is extended that prevents the electric circuit from moving away from the spreader while the plastic is being filled in, and that the stop mechanism is withdrawn before the centering holder and the spreader are withdrawn. In this case, a stop mechanism is additionally used that presses the printed board against the spreader and ensures that, for example, the Hall IC securely lies on the distance finger during the casting process as well. To prevent the stop mechanism, during withdrawal of the spreader, from pressing the printed board in the direction of the spreader being withdrawn, it is advisable to withdraw the stop mechanism shortly before the spreader. If both the stop mechanism and the spreader are withdrawn at the same time, on the other hand, there is the advantage that the suction forces in both directions are approximately equal, in such a way that the printed board securely remains in its place in this area.

Preferably, the spreader accordingly has a distance finger that is insertable into the inside of the casting mold and supports the Hall element of the electric circuit. Of course, within the scope of the invention this can also be another component or a point on the electric circuit where the distance is essential.

In a preferred embodiment the centering fingers are grouped around the central distance finger at suitable distance. Thus, the centering fingers can be spread uniformly at the side wall of the casting space, for example. They can also be designed in such a way that they engage the edge area of the printed board of the electric circuit or even act directly on the edge of the printed board. To be able to better establish the level of the position of the supported component (Hall element), The distance finger is a cylindrical pin which, with its face, supports the electric circuit by way of a component preferably a Hall IC, mounted facing the pin on a printed board. In this regard it is important that on the one hand the distance finger is not given too large a diameter, so that the suction forces and the surface to be closed by subsequently flowing plastic do not become too great when it travels back. On the other hand, the diameter of this finger should not be too small either, to ensure an adequate bearing surface for the component.

The centering effect in the lateral direction of the printed board can be achieved by a corresponding sloping of the bearing surfaces on the centering fingers. The conical course of these surfaces at the same time also facilitates a withdrawal of the centering fingers from the hardening cast mass.

To be able to withdraw the distance finger before or after the centering fingers, the distance finger or fingers are moveable independently of the centering finger or fingers. By constructing a stop mechanism having a retention pin directed preferably sloping through the side wall of the casting mold toward the electric circuit, the electric circuit is secured from floating during the injection molding and, at the same time, provide for an exact position for the critical point on the printed board, in that the printed board is clamped between the stop mechanism and the spreader.

So that no mechanical damage is done to the electric circuit by the stop mechanism, the printed board of the electric circuit is equipped, on the side facing away from the distance finger, with a comparably large second component, in particular a magna, and that the pin engages this component in the retention status. This feature is recommended in a further development of the invention, insofar as a Hall sensor with magnet is used.

In the event that the centering fingers (preferably three centered together) have no sloping surfaces on which the edges of the printed board lie, clamping the edges of the printed board between the side walls of the centering fingers should not be ruled out. When withdrawing the centering fingers after the distance finger, the centering fingers could then pull the printed board downward and the prescribed distance in the area of the spreader would thus not be maintained. For such cases, it is particularly advisable to withdraw the spreader after the centering fingers, in such a way that under these circumstances as well, the defined position of the Hall element is maintained during the casting process.

While with known sensors, the case consists of several parts and thus the exact arrangement of the sensor also depended on the exact assembly of the case parts, the difficulties occurring during fastening can be eliminated by casting the mounting opening integral with the case. In addition, the case according to the invention can also be utilized to secure the position of the supply cable by running the supply cable at an angle wherein the case envelopes the angle in an anti-kink form. This is applicable particularly when the longitudinal direction of the sensor is at an angle to the exit direction of the cable. A fastening of the sensor is also made possible because a fastening link can also be injected on at the same time.

BRIEF DESCRIPTION OF THE DRAWING

FIG. 1 discloses a casting mold according to the invention with, in it, a cast-round electric circuit according to the invention.

FIG. 2 discloses the casting mold according to FIG. 1, whereby the spreader and the centering holder are withdrawn.

DETAILED DESCRIPTION OF THE PREFERRED EMBODIMENTS

Figure 3:
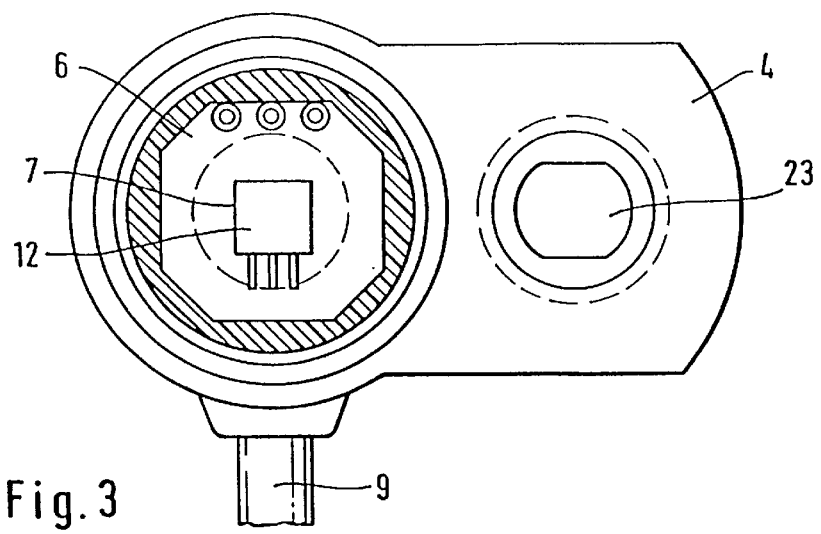
FIG. 3 discloses a section in FIG. 1 seen from below, of the electric circuit provided with a case, whereby the section runs along the surface of the electric circuit.

FIG. 1 shows a casting shell 1 with, shown in cut-outs, shell parts 2 and 3 which enclose as casting mold the impression to be filled. Situated in the casting shell 1 is the circuit case 4 formed by an injection molding process and which essentially envelopes an electric circuit 5. The electric circuit 5 is arranged on a printed board 6 and in this case is preferably designed as a sensor circuit that has a Hall-IC 7 below the printed board 5 and a magnet 8 above the printed board. A connecting line 9 that can be connected with connectors leads to the electric circuit 5. The contacts can also be situated on the circuit case 4, however, in such a way that the connector can be integrated into the case 4. As can be seen in FIG. 2, the connecting line runs at an angle, whereby the case 4 serves as kink-protection.

It is important for the invention that the Hall IC 7, which can contain several Hall elements, is precisely aligned with its IC surface 12 opposite the bottom surface 10 of the casting mold 11 to be filled and that this IC surface is at only a very small distance a of 0.3 mm, for example. In this regard, the circuit case 4 should enclose the electric circuit 5 seamlessly and absolutely tightly, also in the area of the small distance a.

To achieve this, a centering holder 13a, 13b and a spreader 14a, 14b are used that are movable independently of each other. As regards the centering holder, in FIGS. 1 and 2 two jointly moved centering fingers 13a, 13b are shown, whereby in FIG. 1 the right centering finger 13b is shown in the position inserted into the casting mold 11. The two centering fingers 13c and 13d in FIG. 2 are shown in withdrawn position. Also used to align the electric circuit 5, in particular the Hall IC 7, is a spreader 14a, 14b, of which only the holding finger 14 is shown; it is shown in FIG. 2 in withdrawn position and in FIG. 1 in the right half in withdrawn position 14a and in the right half of this figure in inserted position 14b.

In FIG. 2 one can clearly see that in withdrawn position, the face 15 of the distance finger 14 is parallel to the bottom surface 10 of the casting mold 11 and, at the same time, is aligned parallel to the IC surface 12, as the invention intends to achieve. In this regard, as already described above, the distance a should be very small, roughly 0.3 mm, for example.

Figure 4:
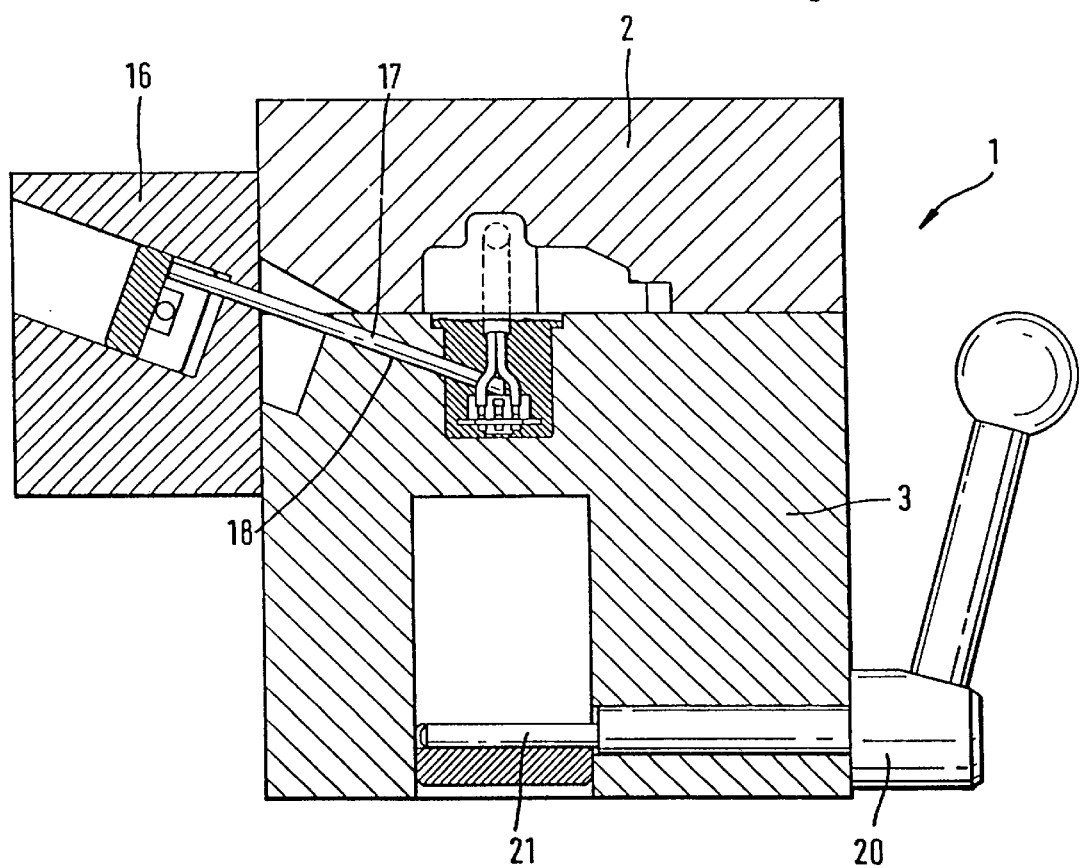
FIG. 4 discloses reduced, diagram form, the casting mold according to FIG. 1 with flange-mounted stop mechanism in extended position and a first actuating mechanism.

In addition, FIG. 4 shows a stop mechanism 16 that is flange-mounted onto the shell 1, and that points with a retention pin through a conduit 18 projecting sloping through the shell half 3, at the magnet 8 of the electric circuit 5. In this regard, the stop mechanism 16 is shown in FIG. 4 in the status inserted into the casting mold 11, in which the retention pin 17 acts on the magnet 8, and in FIG. 5 in withdrawn status. The pin 17 can be driven in basically known manner by way of an excentric 19 that is connected with a crank not shown.

Figure 5:
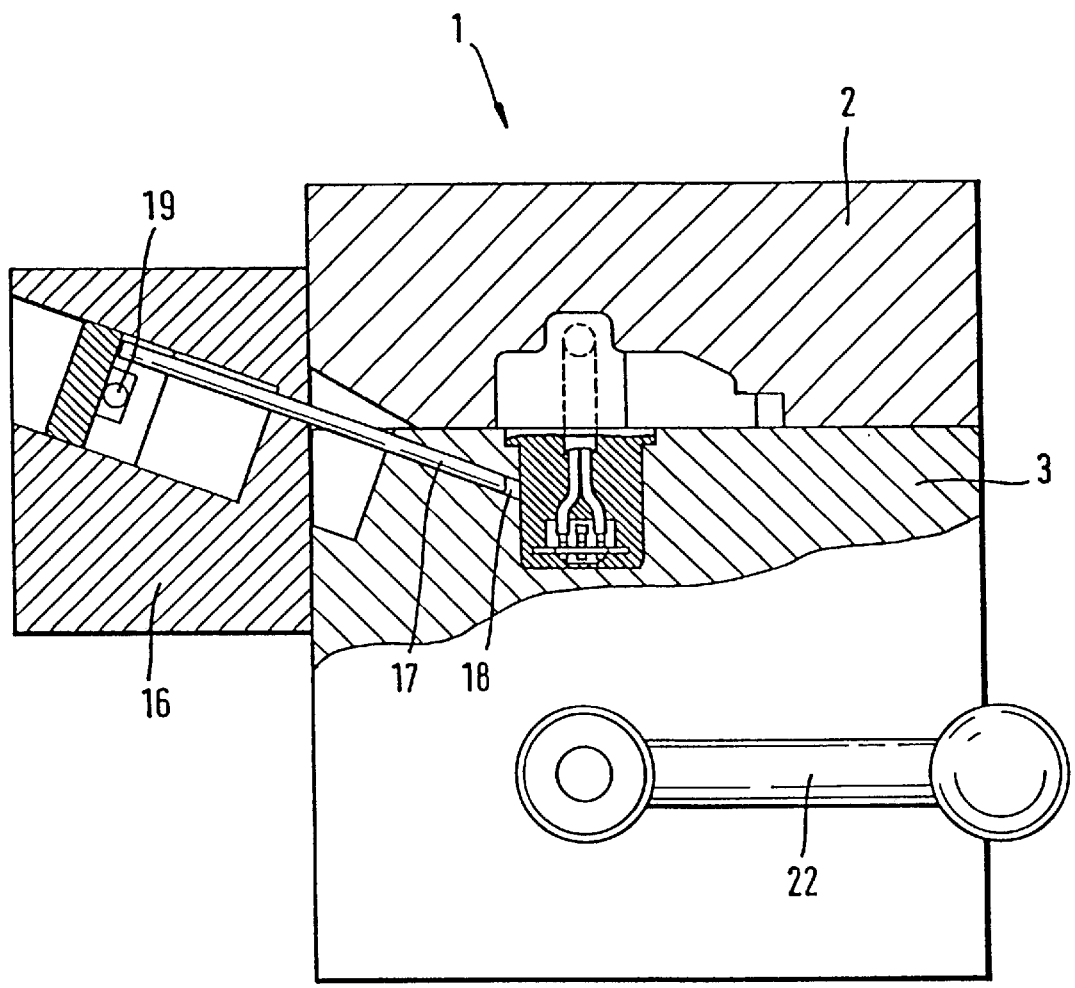
FIG. 5 is a cross sectional view according to FIG. 4 with a withdrawn stop mechanism with second actuating mechanism indicated.

In FIG. 4, a first actuating mechanism 20 is indicated that can drive the centering fingers 13a through 13d of the centering holder 13 by way of an excentric 21, while a second actuating mechanism 22 in FIG. 5 engages the holding finger 14 of the spreader and can insert (see 14b) the holding finger 14 into the casting mold 11 (see 14b) or withdraw it (see 14a).

The casting round the sensor circuit 5 and thereby the casting of the case 4 can then take place as follows. As shown concerning the centering finger 13b in FIG. 1, all centering fingers 13 joined in one piece are inserted into the casting mold 11. In the same way, the distance finger 14 is inserted by the amount a shown in the right half of FIG. 1 (distance finger 14b). Then, the electric circuit 5 connected with the connecting line 9 is laid into the casting mold 11 in such a way that the Hall IC 7 lies on the distance finger 14b and the edge of the printed board 11 is centered and held by the centering fingers 13b. The centering fingers can have bearing surfaces 24 for this. Then, in any desired order the casting mold 11 is closed by placing the second shell part 2 onto the first shell part 3 and the centering pin 17 stop mechanism is extended until it touches down on the magnet 8 and, with the thus exerted force, clamps the stacked unit composed of magnet 8, printed board 6 and Hall IC 7, between the distance finger 14b and the retention pin 17. The IC surface 12 is thereby at the prescribed distance a from the bottom surface 10 of the casting mold 11.

Then, the slow-setting plastic is injected under pressure into the casting mold 11 at a suitable opening, preferably over the first shell part 2, until the casting mold 11 is filled under pressure, with holding means inserted into the casting mold. As soon as the plastic mass has sufficiently hardened, the centering fingers 13b are withdrawn until they are in the position shown in 13a, 13c and 13d. The spreader maintains its position. Then, in any order or at the same time, the pin 17 and the distance finger 14 are withdrawn, in such a way that these holding elements assume the position indicated in FIG. 5 and/or FIG. 2. The still sufficiently soft plastic fills the impression resulting from the withdrawal, and the same applies to the impression concerning the centering fingers 13. In this regard, it is important that when withdrawing these two last-mentioned holding elements, the plastic serving to shape the circuit case 4 is already solid enough that, because of the comparably large printed board surface, the printed board does not move even when the holding finger 14 and/or the pin 17 are withdrawn. Moreover, the forces hereby exerted are comparably weak, because the distance finger can be made very small in diameter and, because of the small distance, the resulting impression is quite small. The same applies to the pin 17, whose suction action on the electric circuit 5 is not particularly great anyway because of the sloping position of the pin 17. The casting mold can be constructed in such a way that the suction forces of the two last-mentioned holding elements cancel each other out when they are withdrawn at the same time.

The invention additionally creates the possibility to provide, at a defined place, for a mounting opening 23 in slot form, in such a way that due to these measures, the sensor case is aligned very precisely over the slot during fastening.

What is claimed is:

1. Method for casting around an electronic circuit, of the type used in distance-measuring systems in motor vehicles, comprising the steps of:

placing the electric circuit on a centering holder arranged movably inside a casting mold shell and inserting the electric circuit into a casting mold, supporting the electric circuit with a spreader that is insertable into the casting mold wherein the spreader projects with at least one distance finger into the casting mold to support the electric circuit;

closing the casting mold and filling the casting mold with a slow-setting plastic, wherein the plastic partially sets during filling, withdrawing the centering holder during setting but prior to solidification from the casting mold;

withdrawing the distance finger from the casting mold during setting at a different time than withdrawing the centering holder but prior to solidification; and removing after solidification the cast-around electric circuit from the casting mold.

2. Method according to claim 1, wherein the electric circuit is supported essentially in the middle thereof and in the same direction as the centering holder by the distance finger of the spreader in the casting mold.

3. Method according to claim 2, wherein the distance finger engages a Hall IC component of the electric circuit; the Hall IC component being arranged on a printed board that is supported on the centering holder.

4. Method according to claim 2, wherein during the setting of the plastic, first the spreader is withdrawn from the casting mold then, after a predetermined period, the centering holder is withdrawn from the casting mold.

5. Method according to claim 3, wherein the spreader is withdrawn until its face facing the electric circuit essentially ends with the bottom surface of the casting mold.

6. Method according to claim 1, wherein after the electric circuit is placed in the casting mold and before the plastic is filled in, a stop mechanism is extended that prevents the electric circuit from moving away from the spreader while the plastic is being filled in, and that the stop mechanism is withdrawn before the centering holder and the spreader are withdrawn.

7. Casting mold for casting around an electronic circuit comprising:
   a mold casing,
   a spreader provided with at least one distance finger that can be extended at an essentially central point of the bottom surface of the mold casing and supports an electric circuit within a casting mold essentially at a central point of the electric circuit, facing the distance finger, and
   a centering holder that cooperates with the distance finger to support the electric circuit when the mold casing is filled with plastic, the centering holder being selectively removable independently of the distance finger during hardening of the plastic.

8. Casting mold according to claim 7, wherein the distance finger of the spreader is arranged essentially centrally in relation to centering fingers of the centering holder, wherein the centering fingers support an outer portion of the electric circuit.

9. Casting mold according to claim 7, wherein the electric circuit is arranged on a printed board and centering fingers of the centering holder engage the edges of the printed board.

10. Casting mold according to claim 7, wherein the distance finger is a cylindrical pin which, with its face, supports the electric circuit via a Hall IC component mounted on a printed board whereby the Hall IC component is mounted so as to be facing the pin.

11. Casting mold according to claim 7, wherein centering fingers of the centering holder can be extended in the area of the side walls of the casting mold from the bottom surface of the casting mold and the centering fingers each have a sloping side surface that engages the edge of a printed board that supports the electric circuit.

12. Casting mold according to claim 7, wherein the distance finger or fingers are movable independently of the centering holder.

13. Casting mold according to claim 7, wherein a stop mechanism is provided that has a retention pin directed at an angle through the side wall of the casting mold toward the electric circuit.

14. Casting mold according to claim 10, wherein the printed board of the electric circuit is equipped, on the side facing away from the distance finger, with a comparably large second component, in particular a magnet, and that the pin engages this component in a retention status.

* * * * *